(12) United States Patent
Seidl et al.

(10) Patent No.: US 12,283,056 B2
(45) Date of Patent: Apr. 22, 2025

(54) INTERACTIVE FORMATION ANALYSIS IN SPORTS UTILIZING SEMI-SUPERVISED METHODS

(71) Applicant: STATS LLC, Chicago, IL (US)

(72) Inventors: Thomas Seidl, Munich (DE); Michael Stöckl, Munich (DE); Patrick Joseph Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 547 days.

(21) Appl. No.: 17/650,733

(22) Filed: Feb. 11, 2022

(65) Prior Publication Data

US 2022/0254036 A1     Aug. 11, 2022

Related U.S. Application Data

(60) Provisional application No. 63/148,397, filed on Feb. 11, 2021.

(51) Int. Cl.
| | | |
|---|---|---|
| *G06T 7/215* | (2017.01) | |
| *G06V 20/40* | (2022.01) | |
| *G06V 40/20* | (2022.01) | |

(52) U.S. Cl.
CPC .............. *G06T 7/215* (2017.01); *G06V 20/44* (2022.01); *G06V 20/46* (2022.01); *G06V 40/23* (2022.01); *G06T 2207/30224* (2013.01); *G06T 2207/30241* (2013.01)

(58) Field of Classification Search
CPC ........... G06T 7/215; G06T 2207/30221; G06T 2207/30228; G06T 2207/30241; G06V 40/23; G06V 20/44

USPC .......................................................... 382/103
See application file for complete search history.

(56) References Cited

U.S. PATENT DOCUMENTS

| | | | |
|---|---|---|---|
| 2015/0131845 A1 | 5/2015 | Forouhar et al. | |
| 2016/0092769 A1 | 3/2016 | Lucey et al. | |
| 2019/0388731 A1* | 12/2019 | DeAngelis | ................ G06T 7/70 |
| 2020/0236288 A1 | 7/2020 | Schwartz et al. | |

OTHER PUBLICATIONS

PCT International Application No. PCT/US22/16125, International Search Report and Written Opinion of the International Searching Authority, dated May 23, 2022, 7 pages.

* cited by examiner

*Primary Examiner* — Ayodeji O Ayotunde
(74) *Attorney, Agent, or Firm* — Bookoff McAndrews, PLLC

(57) ABSTRACT

A computing system identifies player tracking data and event data corresponding to a match. The match includes a first team and a second team. The player tracking data includes coordinate positions of each player during the event. The event data defines events that occur during the match. The computing system divides the player tracking data into a plurality of segments based on the event information. For each segment of the plurality of segments, the computing system learns a first formation associated with a respective team in possession. For each segment of the plurality of segments, the computing system learns a second formation associated with a respective team not in possession. The computing system maps each first formation to a first class of known formation clusters. The computing system maps each second formation to a second class of known formation clusters.

20 Claims, 11 Drawing Sheets

INTERACTIVE FORMATION ANALYSIS IN SPORTS UTILIZING SEMI-SUPERVISED METHODS

CROSS-REFERENCE TO RELATED APPLICATIONS

This application claims priority to U.S. Provisional Application Ser. No. 63/148,397, filed Feb. 11, 2021, which is hereby incorporated by reference in its entirety.

FIELD OF THE DISCLOSURE

The present disclosure generally relates to a system and method for learning team formations in sports.

BACKGROUND

Increasingly, sports fans and data analysts have become entrenched in sports analytics. In some situations, especially on the team-side and analyst-side of sports analytics, predicting an opponent's formation could be critical to a team's strategy heading into a game or match. The act of identifying an opponent's or team's formation has not been a trivial task, however.

SUMMARY

In some embodiments, a method is disclosed herein. A computing system identifies player tracking data and event data corresponding to a match. The match includes a first team and a second team. The player tracking data includes coordinate positions of each player during the event. The event data defines events that occur during the match. The computing system divides the player tracking data into a plurality of segments based on the event information. For each segment of the plurality of segments, the computing system learns a first formation associated with a respective team in possession. For each segment of the plurality of segments, the computing system learns a second formation associated with a respective team not in possession. The computing system maps each first formation to a first class of known formation clusters. The computing system maps each second formation to a second class of known formation clusters.

In some embodiments, a non-transitory computer readable medium is disclosed herein. The non-transitory computer readable medium includes one or more sequences of instructions, which, when executed by one or more processors, causes a computing system to perform operations. The operations include identifying, by the computing system, player tracking data and event data corresponding to a match that includes a first team and a second team. The player tracking data includes coordinate positions of each player during the event and wherein the event data defines events that occur during the match. The operations further include dividing, by the computing system, the player tracking data into a plurality of segments based on the event data. The operations further include, for each segment of the plurality of segments, learning, by the computing system, a first formation associated with a respective team in possession. The operations further include, for each segment of the plurality of segments, learning, by the computing system, a second formation associated with a respective team not in possession. The operations further include mapping, by the computing system, each first formation to a first class of known formation clusters. The operations further include mapping, by the computing system, each second formation to a second class of known formation clusters.

In some embodiments, a system is disclosed herein. The system includes a processor and a memory. The memory has programming instructions stored thereon, which, when executed by the processor, causes the system to perform operations. The operations include identifying player tracking data and event data corresponding to a match that includes a first team and a second team. The player tracking data includes coordinate positions of each player during the event and wherein the event data defines events that occur during the match. The operations further include dividing the player tracking data into a plurality of segments based on the event data. The operations further include, for each segment of the plurality of segments, learning a first formation associated with a respective team in possession. The operations further include, for each segment of the plurality of segments, learning a second formation associated with a respective team not in possession. The operations further include mapping each first formation to a first class of known formation clusters. The operations further include mapping each second formation to a second class of known formation clusters.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In sports, there typically exists strong, complex group-structure, which is less prevalent in other multi-agent systems, such as pedestrian tracking. Specifically, the formation of a team may capture not only the global shape and structure the group, but also may enable the ordering of each agent according to a "role" within the group structure. In this regard, sports may possess relational structure similar to that of faces and bodies, which may be represented as a graph of key-points.

Unlike for faces and bodies, the representation graph in sports is dynamic as players constantly move and switch positions. Thus, dynamically discovering the appropriate representation of individual players according to their role in a formation, provides both structural information while learning a useful representation for subsequent tasks. Role-based alignment may allow for the reformatting of unstructured multi-agent data into a consistent vector format that enables subsequent machine learning to occur.

Previous approaches of estimation a team's formation have been performed in an unsupervised manner, where hidden underlying structure has emerged using various clustering approaches. Although powerful and visual, mapping the formation to a clear semantic label (e.g., 4-4-2, 3-5-2, 4-1-4-1) allows for quick semantic analysis. Moreover, mapping to a semantic layer or different formation classes may also enable the detection of determining when a team is changing formation within a game. Previous approaches to formation learning are unable to perform such functionality.

To improve upon previous formation learning approaches, one or more techniques described herein allows for a team's formation to be mapped to a semantic label, thus allowing for temporal analysis of a team's formation across an entire game at the semantic level. Further, one or more techniques described herein may also illustrate how a team's formation can be estimated across a plurality of matches, as well as allowing for multi-match formation analysis to be conducted based on a specific visual query. For example, using one or more techniques described herein, a system may be able to handle complex user queries such as "show me formations across these X matches" and "show me the formation of team Y across X matches, where the ball trajectory or specific play is similar to the visual input."

Further, although the present application focuses on the sport of soccer as the use-case, those skilled in the art understand that the present techniques can be applied to sports beyond soccer, such as, but not limited to, basketball, football, hockey, rugby, and the like.

Figure 1:
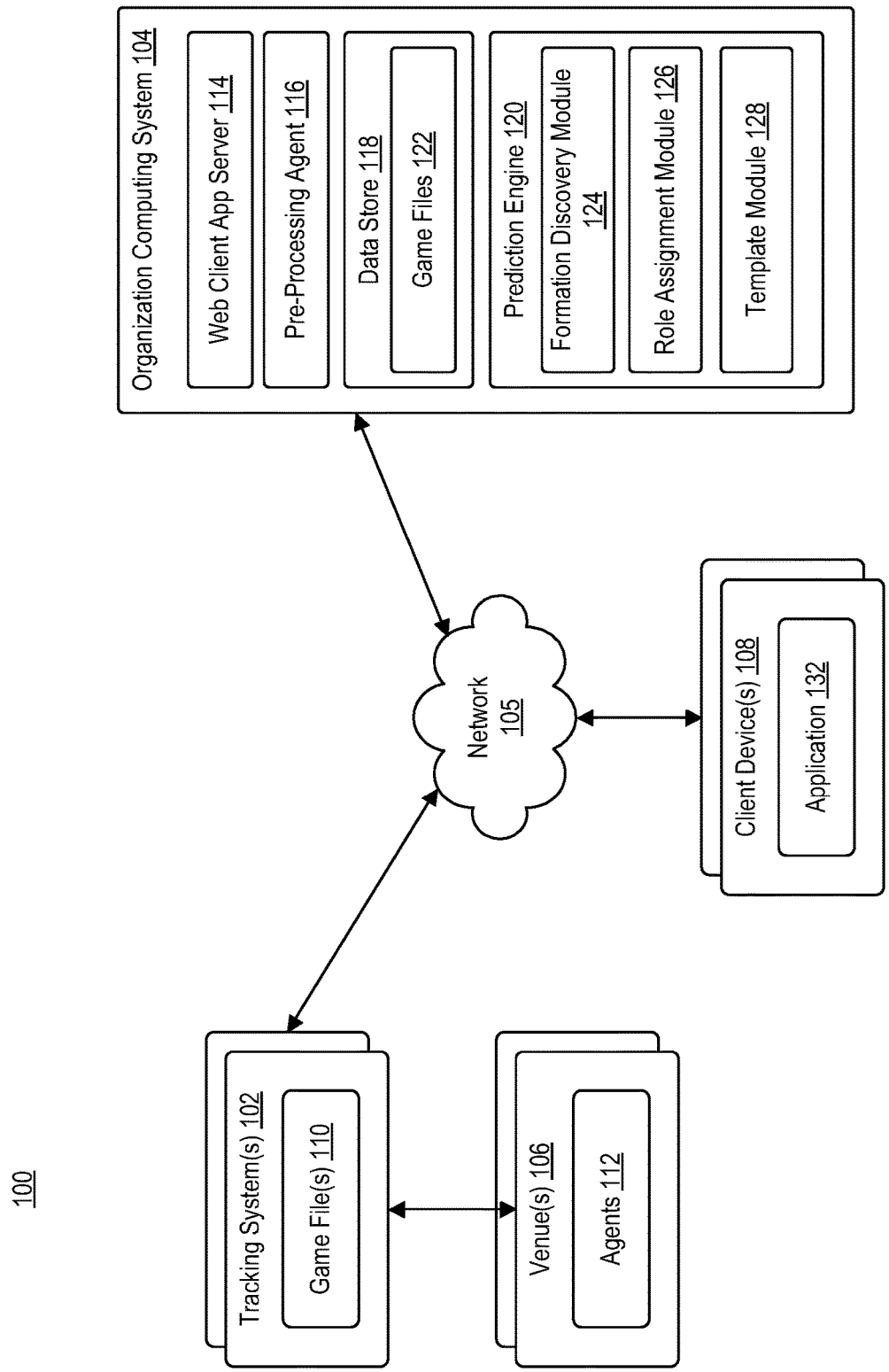
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to record the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In some embodiments, tracking system 102 may be a radio-based system using, for example, radio frequency identification (RFID) tags worn by players or embedded in objects to be tracked. Generally, tracking system 102 may be configured to sample and record, at a high frame rate. Tracking system 102 may be configured to store at least player identity and positional information (e.g., (x, y) position) for all agents and objects (e.g., ball, puck, etc.) on the playing surface for each frame in a game file 110.

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing agent 116, a data store 118, and prediction engine 120. Each of pre-processing agent 116 and prediction engine 120 may be comprised of one or more software modules. The one or more software modules may be collections of code or instructions stored on a media (e.g., memory of organization computing system 104) that represent a series of machine instructions (e.g., program code) that implement one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 122. Each game file 122 may be captured and generated by a tracking system 102. In some embodiments, each of the one or more game files 122 may include all the raw data captured from a particular game or event. For example, the raw data captured from a particular game or event may include x-,y-coordinates of the game.

Pre-processing agent 116 may be configured to process data retrieved from data store 118. For example, pre-processing agent 116 may be configured to generate one or more sets of information that may be used to train components of prediction engine 120 that are associated with predicting a team's formation. Pre-processing agent 116 may scan each of the one or more game files stored in data store 118 to identify one or more metrics that include, but are not limited to, the team that has possession, the opponent, number of players on each team, x-,y-coordinates of the ball (or puck), and the like. In some embodiments, game context may be provided, such as, but not limited to, the current score, time remaining in the game, current quarter/half/inning/period, and the like.

Prediction engine 120 may be configured to predict an underlying formation of a team. Mathematically, the goal of role-alignment procedure may be to find the transformation A: $\{U_1, U_2, \ldots, U_n\} \times M \rightarrow [R_1, R_2, \ldots, R_K]$, which may map the unstructured set U of N player trajectories to an ordered set (i.e., a vector) of K role-trajectories R. Each player trajectory itself may be an ordered set of positions $U_n = [x_{s,n}]_{s=1}^{S}$ for an agent $n \in [1, N]$ and a frame $s \in [1, S]$. In some embodiments, M may represent the optimal permutation matrix that enables such an ordering. The goal of prediction engine 120 may be to find the most probable set of $\mathcal{F}^*$ of two-dimensional (2D) probability density functions:

$$\mathcal{F}^* = \underset{\mathcal{F}}{\operatorname{argmax}}\ P(\mathcal{F} \mid R)$$

$$P(x) = \sum_{n=1}^{N} P(x \mid n) P(n) = \frac{1}{N} \sum_{n=1}^{N} P_n(x)$$

In some embodiments, this equation may be transformed into one of entropy minimization where the goal is to reduce (e.g., minimize) the overlap (i.e., the KL-Divergence) between each role. As such, in some embodiments, the final optimization equation in terms of total entropy H may become:

$$\mathcal{F}^* = \underset{\mathcal{F}}{\operatorname{argmax}} \sum_{n=1}^{N} H(x \mid n)$$

As shown, prediction engine 120 may include formation discovery module 124, role assignment module 126, and template module 128, each corresponding to a distinct phase of the prediction process. Formation discovery module 124 may be configured to learn the distributions which maximize the likelihood of the data. Role assignment module 126 may be configured to map each player position to a "role" distribution in each frame. Once the data has been aligned, template module 128 may be configured to map each learned formation a formation cluster template.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may use access application 132 to access one or more functionalities of organization computing system 104. Client device 108 may communicate over network 105 to request a webpage, for example, from web client application server 114 of organization computing system 104. For example, client device 108 may be configured to execute application 132 to access content managed by web client application server 114. The content that is displayed to client device 108 may be transmitted from web client application server 114 to client device 108, and subsequently processed by application 132 for display through a graphical user interface (GUI) of client device 108.

Figure 2A:
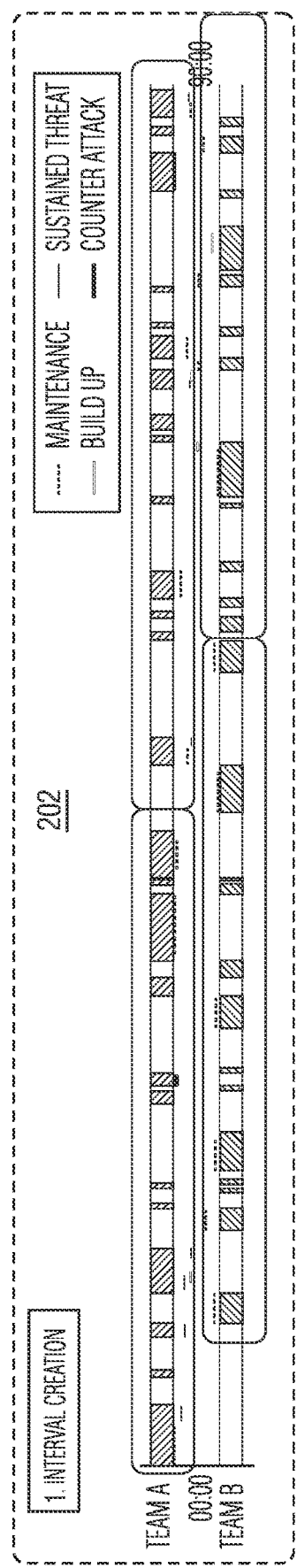
FIGS. 2A-2C are block diagrams illustrating a formation assignment process, according to example embodiments.
Figure 2B:
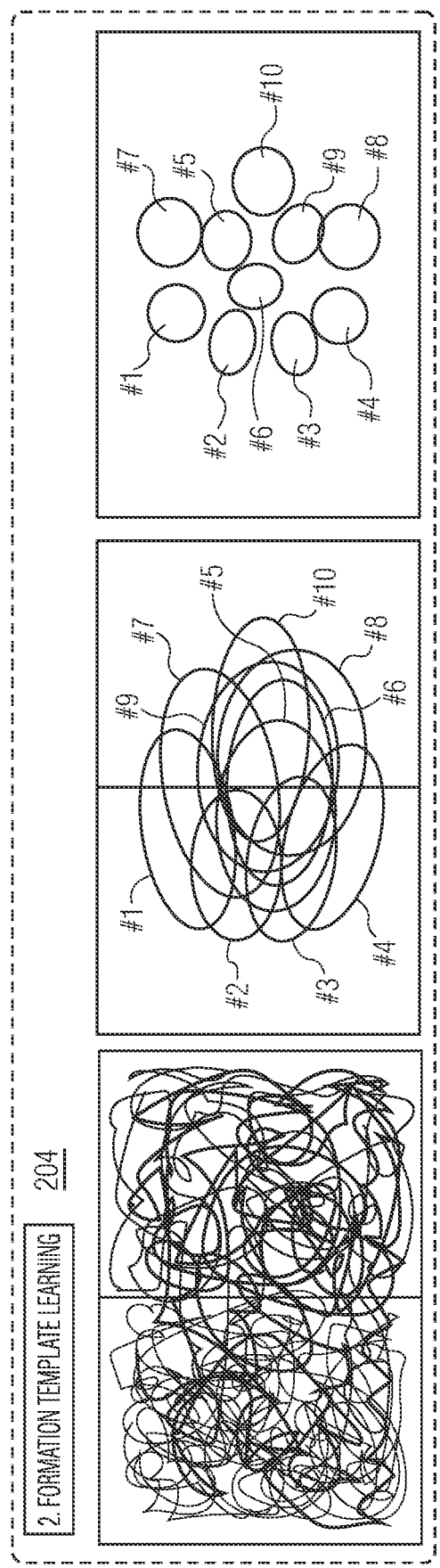
Figure 2C:
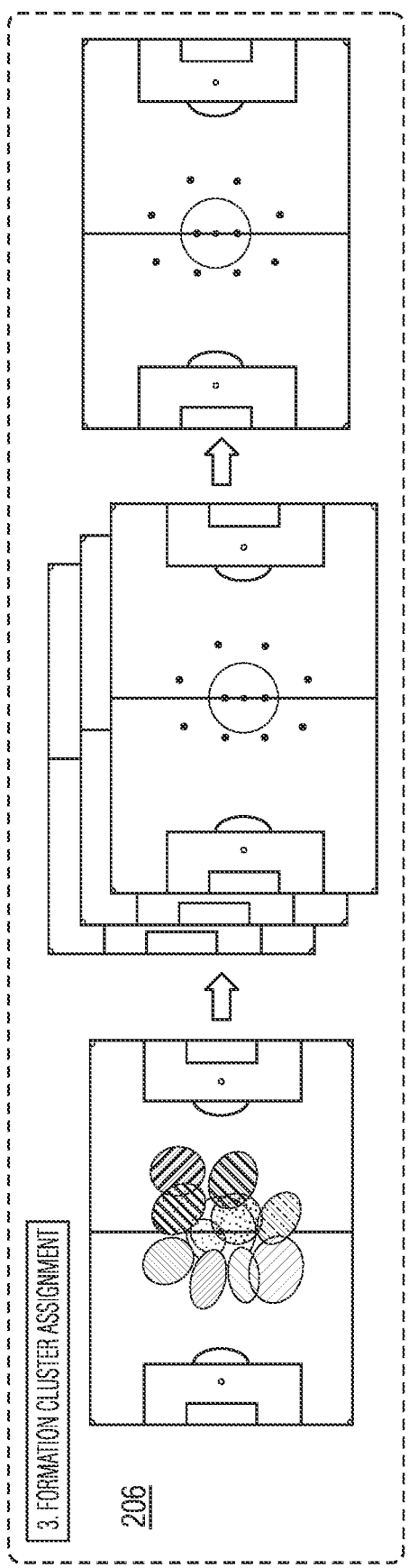

FIGS. 2A-2C are block diagrams illustrating a formation-learning process, according to example embodiments. Formation-learning process may include steps 202, 204, and 206.

As shown in FIG. 2A, at step 202, organization computing system 104 may receive tracking data and/or event data for a plurality of events across a plurality of seasons. For each event, pre-processing agent 116 may divide the event into a plurality of segments based on the event information. In some embodiments, pre-processing agent 116 may divide the event into a plurality of segments based on various events that may occur throughout the game. For example, pre-processing agent 116 may divide the event into a plurality of segments based on one or more events that include, but may not be limited to, red cards, ejections, technical fouls, flagrant fouls, player disqualifications, substitutions, halves, periods, quarters, overtime, and the like. Generally, each segment of a plurality of segments associated with an event may include an interval of a requisite duration (e.g., at least one minute of play, at least two minutes of play, etc.) Such requisite duration may allow organization computing system 104 to detect a team's formation.

Each segment may include a set of tracking data associated therewith. The player tracking data may be captured by tracking system 102, which may be configured to record the (x, y) positions of the players at a high frame rate (e.g., 10 Hz). In some embodiments, the player tracking data may further include single-frame event-labels (e.g., pass, shot, cross) in each frame of player tracking data. These frames may be referred to as "event frames." As shown, the initial player tracking data may be represented as a set U of N player trajectories. Each player trajectory itself may be an ordered set of positions $U_n = [x_{s,n}]_{s=1}^{S}$ for an agent $n \in [1, N]$ and a frame $s \in [1, S]$.

In some embodiments, pre-processing agent 116 may normalize the raw position data of the players. For example, pre-processing agent 116 may normalize the raw position data of the players in each segment so that all teams in the player tracking data are attacking from left to right and have zero mean in each frame. Such normalization may result in the removal of translational effects from the data. This may yield the set $U' = \{U_1', U_2', \ldots, U_n'\}$.

In some embodiments, pre-processing agent 116 may initialize cluster centers of the normalized data set for formation discovery with the average player positions. For example, average player positions may be represented by the set $\mu_0 = \{\mu_1, \mu_2, \ldots, \mu_3\}$. Pre-processing agent 116 may take the average position of each player in the normalized data and may initialize the normalized data based on the average player positions. Such initialization of the normalized data based on average player position may act as initial roles for each player to minimize data variance.

As shown in FIG. 2B, at step 204, organization computing system 104 may learn a formation template from the tracking data for each segment. For example, formation discovery module 124 may learn the distributions which maximize the likelihood of the data. Formation discovery module 124 may structure the initialized data into a single (SN)×d vector, where S may represent the total number of frames, N may represent the total number of agents (e.g., ten outfielders in the case of soccer, five players in the case of basketball, fifteen players in the case of rugby, etc.) and d may represent the dimensionality of the data (e.g., d=2).

Formation discovery module 124 may then initiate a formation discovery algorithm. For example, formation discovery module 124 may initialize a K-means algorithm using the player average positions and execute to convergence. Executing the K-means algorithm to convergence produces better results than conventional approaches of running a fixed number of iterations.

Formation discovery module 124 may then initialize a Gaussian Mixture Model (GMM) using cluster centers of the last iteration of the K-means algorithm. By parametrizing the distribution as a mixture of K Gaussians (with K being equal to the number of "roles," which is usually also equal to N, the number of players), formation discovery module 124 may be able to identify an optimal formation that maximizes the likelihood of the data x. In other words, GMM may be configured to identify $\mathcal{F}*=\{P_1, P_2, \ldots, P_K\}$, where $\mathcal{F}*$ may represent the optimal formation that maximizes the likelihood of the data x. Therefore, instead of stopping the process after the last iteration of the K-means algorithm, formation discovery module 124 may use GMM clustering, as the ellipse may better capture the shape of each player role compared to only a K-means clustering technique, which captures the spherical nature of each role's data cloud.

Further, GMMs are known to suffer from component collapse and become trapped in pathological solutions. Such collapse may result in non-sensible clustering, i.e., non-sensical outputs that may not be utilized. To combat this, formation discovery module 124 may be configured to monitor eigenvalues ($\lambda_i$) of each of the components or parameters of the GMM throughout the expectation maximization process. If formation discovery module 124 determines that the eigenvalue ratio of any component becomes too large or too small, the next iteration may run a Soft K-Means (i.e., a mixture of Gaussians with spherical covariance) update instead of the full-covariance update. Such process may be performed to ensure that the eventual clustering output is sensible. For example, formation discovery module 124 may monitor how the parameters of the GMM are converging; if the parameters of the GMM are erratic (e.g., "out of control"), formation discovery module 124 may identify such erratic behavior and then slowly return the parameters back within the solution space using a soft K-means update.

In order to enforce an ordering, formation discovery module 124 may align the optimal formation $\mathcal{F}*$ to a parent template G*, which is an ordered set of distributions. G* may represent an overall reference formation (or reference ordering) that may be used to compare formations from different games or across different competitions. In some embodiments, formation discovery module 124 may align $\mathcal{F}*$ to G* by finding the Bhattacharyya distance between each distribution in $\mathcal{F}*$ and G* given by:

$$D_B = \frac{1}{8}(\mu_{\mathcal{F}_i^*} - \mu G_j^*)^T \sigma^{-1}(\mu_{\mathcal{F}_i^*} - \mu G_j^*) +$$

$$\frac{1}{2}\ln\frac{\det \sigma}{\sqrt{\det \sigma_{\mathcal{F}_i^*} \det \sigma_{G_j^*}}} \text{ where } \sigma = \frac{\sigma_{\mathcal{F}_i^*} + \sigma_{G_j^*}}{2}.$$

This may create a K×K cost matrix that may be used to find the best assignment. This may result in a learned template $\mathcal{T}*$, which may be an ordered set of distributions with an established ordering that maximizes the likelihood of data.

Role assignment module 126 may map each player position to a "role" distribution in learned template $\mathcal{T}*$. For example, role assignment module 126 may map each player in each frame to a specific role with the restriction that only one player may occupy a role in a given frame. To do this, role assignment module 126 may find the likelihood that each player belongs to each of the discovered distributions in each frame. This may produce an N×K cost matrix for each frame. Role assignment module 126 may then apply the Hungarian algorithm to make the optimal assignment. The aligned data may be represented as an S×(dK) matrix R, which is a per-frame ordered role assignment of players. In essence, role assignment module 126 may apply the Hungarian algorithm to find the permutation matrix, which may minimize the overall total cost matrix (i.e., what set of orderings of players to a particular role will yield the overall minimum total cost where the cost matrix is a pair-wise distance between each position and roll in the formation template).

Figure 7A:
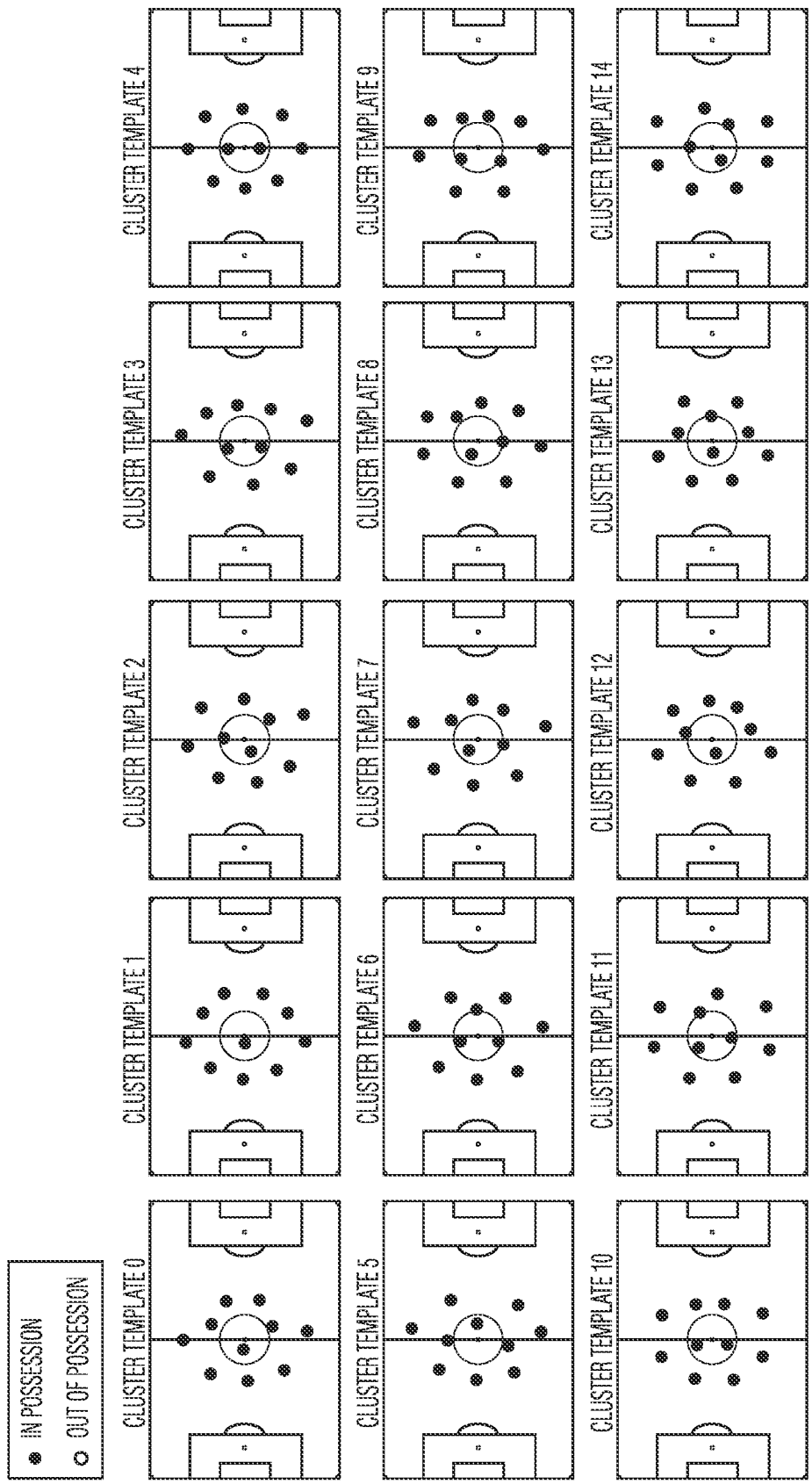
FIGS. 7A-7B are diagrams illustrating example classes of known formation clusters, according to example embodiments.
Figure 7B:
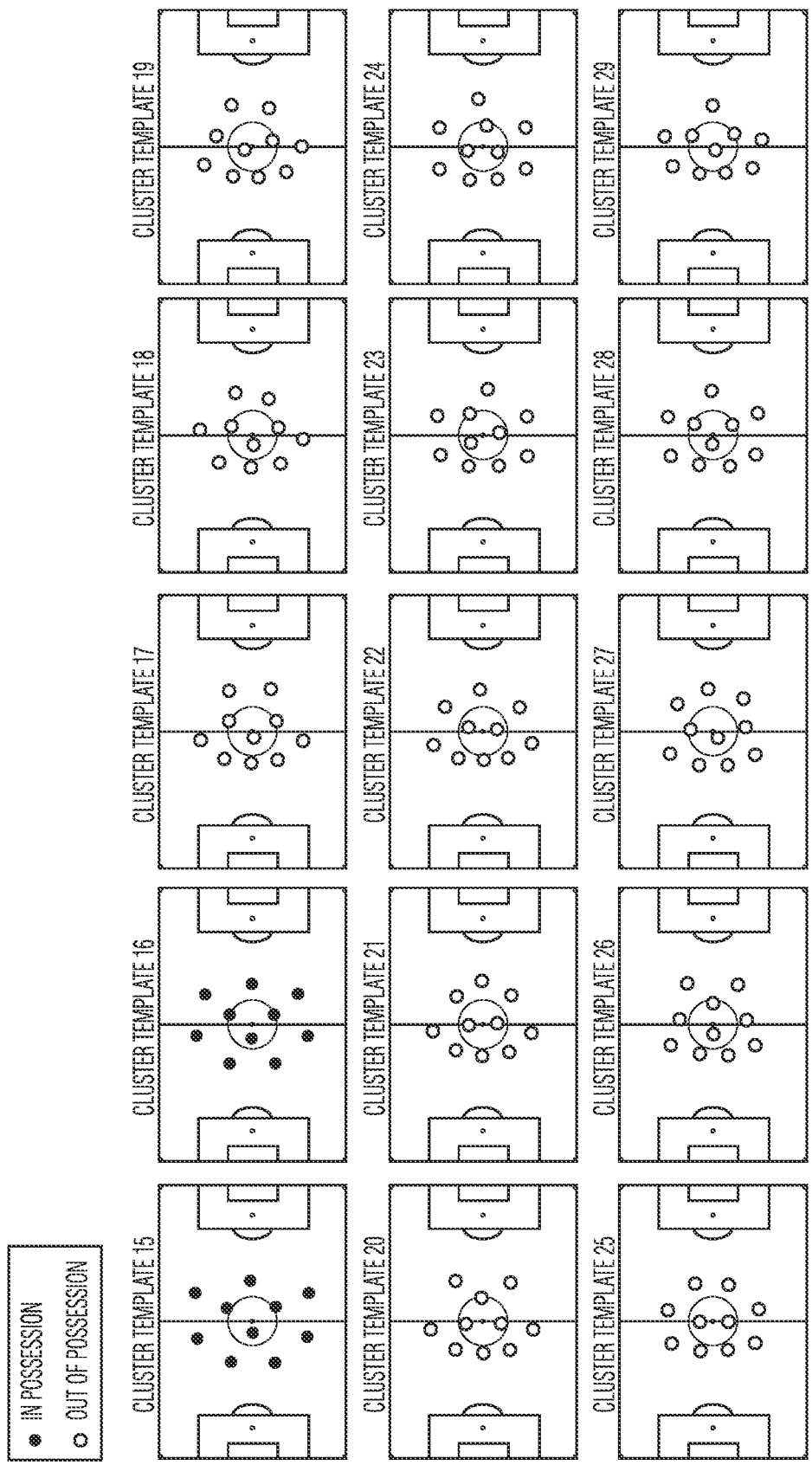

As shown in FIG. 2C, at step 206, organization computing system 104 may find a most likely formation cluster template for segment based on the learned formation. For example, template module 128 may be configured to match each learned template to one or more classes of known formation clusters in a semantic dictionary. In some embodiments, each of the one or more classes of known formation clusters may be differentiated between formations in possessions and out of possession. In other words, segments may be matched to a specific template, depending on which team is analyzed and which team is in position. For example, a formation learned of a team in possession would be compared to one or more classes of known formation clusters of teams in possession; the formation would not be compared to one or more classes of known formation clusters of teams not in possession. To compare each learned formation to one or more classes of known formation clusters, template module 128 may identify a mean and covariance corresponding to each assigned role. Template module 128 may then calculate a difference of each mean compared to a corresponding role location in a known cluster. Template module 128 may map the learned formation to a cluster based on the calculated difference. This may create a K×K distance matrix that may be used to find the best assignment FIGS. 7A-7B are diagrams illustrating example classes of known formation clusters, according to example embodiments. As shown, the classes of known formation clusters may be split between formation clusters of teams in possession and formation clusters of teams out of possession. Further, each formation cluster may be assigned a unique number.

Figure 3:
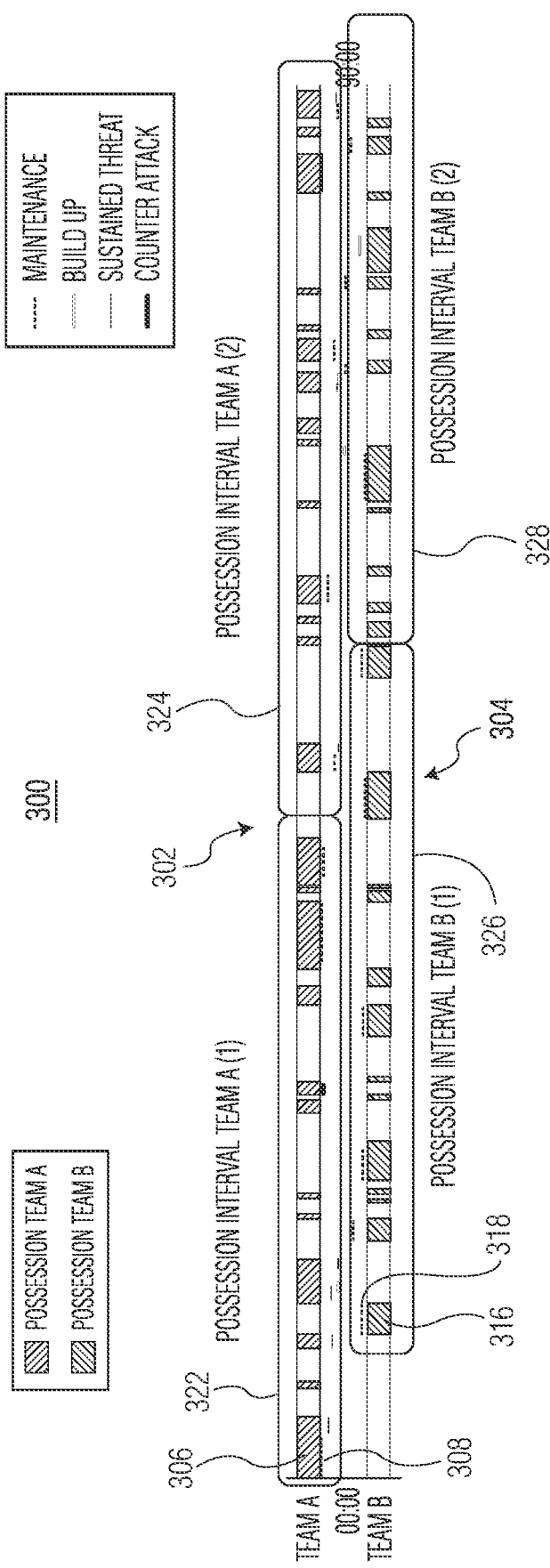
FIG. 3 is a diagram illustrating example segments in an event, according to example embodiments.

FIG. 3 is a diagram 300 illustrating example segments in an event, according to example embodiments. As shown, diagram 300 may include one or more possession timelines 302, 304 for an event between Team A and Team B. Possession timeline 302 may correspond possession information for Team A. For example, possession timeline 302 may include one or more indications 306 that correspond to moments in the event in which Team A had possession. In some embodiments, each indication 306 may include a label 308 associated therewith. Labels 308 may correspond to a possession type. Possession types may include, but are not limited to, maintenance, build up, sustained threat, counter-attack, and the like. Possession timeline 304 may correspond to possession information for Team B. For example, possession timeline 304 may include one or more indications 316 that correspond to moments in the event in which Team A had possession. In some embodiments, each indication 316 may include a label 318 associated therewith. Labels 318 may correspond to a possession type. Possession types may include, but are not limited to, maintenance, build up, sustained threat, counterattack, and the like.

As illustrated, each possession timeline 302, 304 may be divided into a plurality of segments based on the event information. For example, pre-processing agent 116 may divide the event into a plurality of segments based on one or more events that include, but may not be limited to, red cards, ejections, technical fouls, flagrant fouls, player disqualifications, substitutions, halves, periods, quarters, overtime, and the like.

Possession timeline 302 may include a first segment 322 and a second segment 324. Possession timelines 304 may include a first segment 326 and a second segment 328. Prediction engine 120 may map a formation type to each of the first segment 322, second segment 324, first segment 326 and second segment 328 using the one or more techniques described above in conjunction with FIGS. 2A-2C. Prediction engine 120 may perform such functionality based on the tracking data corresponding to each respective segment 322, 324, 326, and 328. For example, for each segment 322, 324, 326, and 328 prediction engine 120 may assign a formation to the team in possession and the team not in possession.

Figure 4:
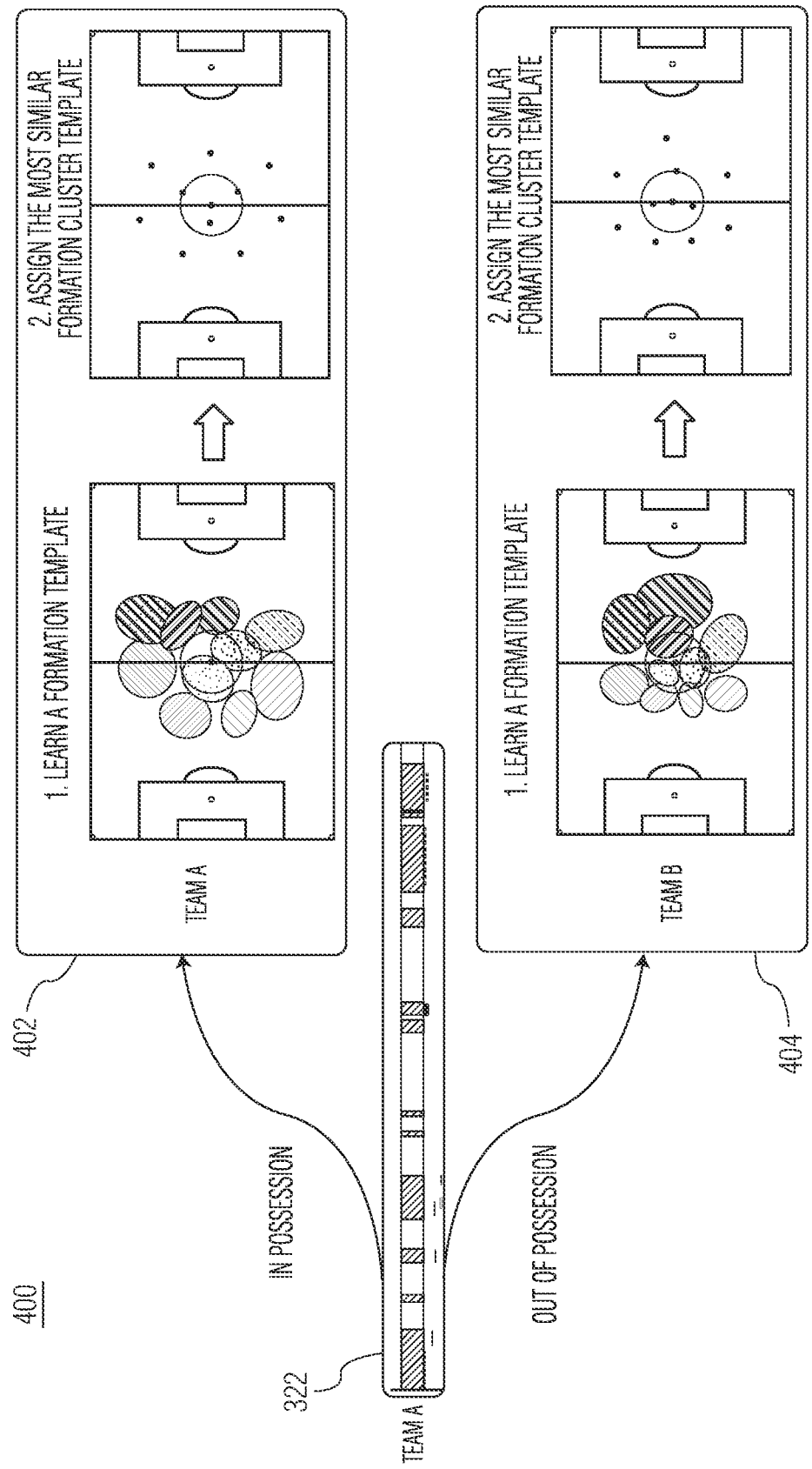
FIG. 4 is a diagram illustrating how segments in an event may be mapped to a cluster template, according to example embodiments.

FIG. 4 is a diagram 400 illustrating how segments in an event may be mapped to a cluster template, according to example embodiments. As shown, diagram 400 has isolated first segment 322 from diagram 300. First segment 322 corresponds to a possession interval for Team A. From first segment 322, two processes 402 and 404 may be initiated. Process 402 may include prediction engine 120 assigning a first formation to the team in possession, i.e., Team A. Process 404 may include prediction engine 120 assigning a second formation to the team not in possession, i.e., Team B.

Figure 5:
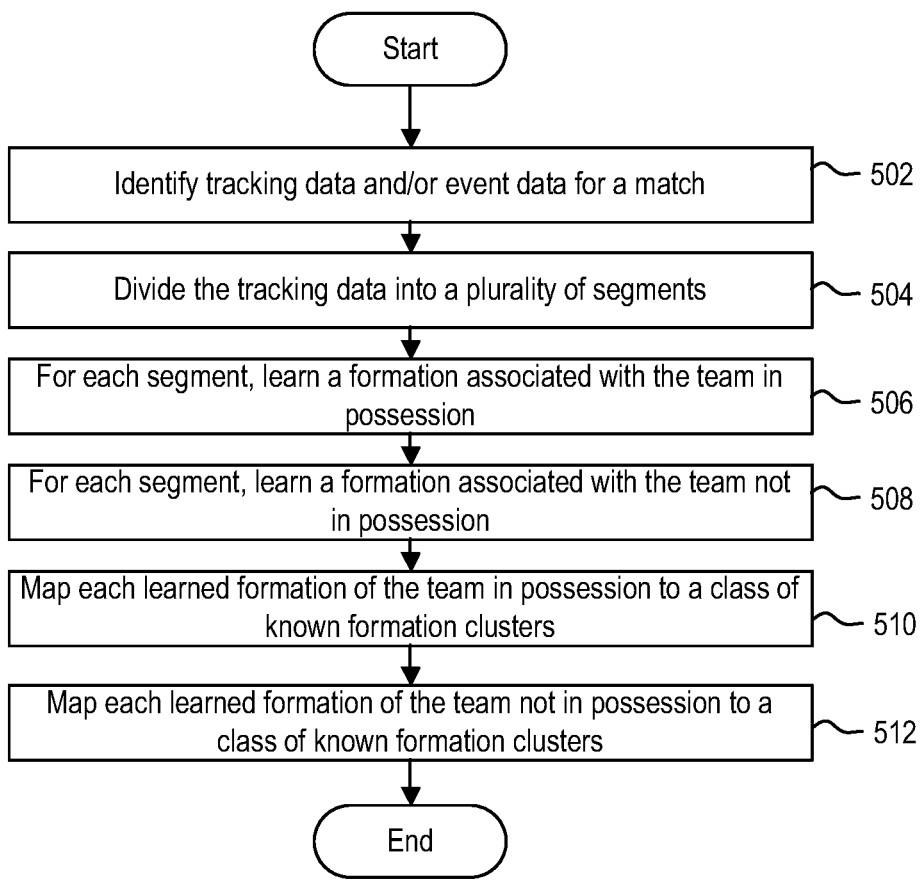
FIG. 5 is a flow diagram illustrating a method of identifying a formation of a first team and a second team in an event, according to example embodiments.

FIG. 5 is a flow diagram illustrating a method 500 of identifying a formation of a first team and a second team in an event, according to example embodiments. Method 500 may begin at step 502.

At step 502, organization computing system 104 may identify tracking data and/or event data for the event. The player tracking data may be captured by tracking system 102, which may be configured to record the (x, y) positions of the players at a high frame rate (e.g., 10 Hz). In some embodiments, the player tracking data may further include single-frame event-labels (e.g., pass, shot, cross) in each frame of player tracking data.

At step 504, organization computing system 104 may divide the tracking data into a plurality of segments. For example, pre-processing agent 116 may divide the event into a plurality of segments based on the event information. In some embodiments, pre-processing agent 116 may divide the event into a plurality of segments based on various events that may occur throughout the game. For example, pre-processing agent 116 may divide the event into a plurality of segments based on one or more events that include, but may not be limited to, red cards, ejections, technical fouls, flagrant fouls, player disqualifications, substitutions, halves, periods, quarters, overtime, and the like. Generally, each segment of a plurality of segments associated with an event may include an interval of a requisite duration (e.g., at least one minute of play). Such requisite duration may allow organization computing system 104 to detect a team's formation. In some embodiments, the segments may be based on the team that has possession.

At step 506, for each segment, organization computing system 104 may learn a formation associated with the team in possession. For example, prediction engine 120 may learn a formation associated with the team in possession in accordance with functionality discussed above in conjunction with FIGS. 2A-2C.

At step 508, for each segment, organization computing system 104 may learn a formation associated with the team not in possession. For example, prediction engine 120 may learn a formation associated with the team not in possession in accordance with functionality discussed above in conjunction with FIGS. 2A-2C.

At step 510, for each learned formation, organization computing system 104 may map each learned formation to a class. For example, template module 128 may map each learned formation corresponding to each segment of a team in possession to one or more classes of known formation clusters in a semantic dictionary.

At step 512, for each learned formation, organization computing system 104 may map each learned formation to a class. For example, template module 128 may map each learned formation corresponding to each segment of a team not in possession to one or more classes of known formation clusters in a semantic dictionary.

Figure 6:
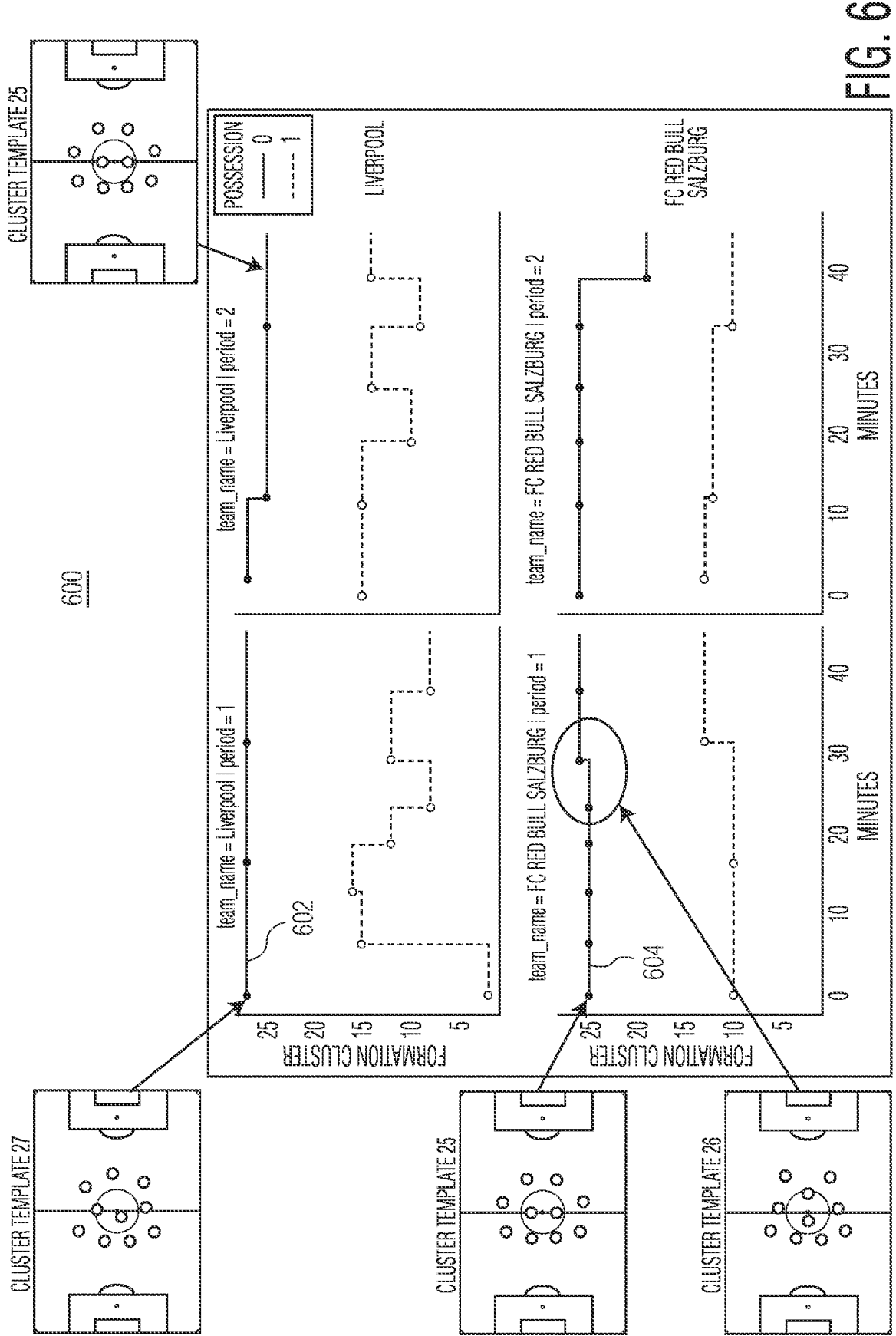
FIG. 6 illustrates an example graphical output, according to example embodiments.

Generally, mapping each learned formation in an event to a respective classes of known formation clusters may allow for dynamic interaction with end users. In some embodiments, organization computing system 104 may generate a graphical representation of the in game formations for each team involved in an event. FIG. 6 illustrates an example graphical output 600, according to example embodiments. Graphical output 600 may include a first set of data 602 corresponding to Team A and a second set of data 604 corresponding to Team B. As shown, graphical output 600 tracks Team A's and Team B's formations across the event. The x-axis may correspond to time; the y-axis may correspond the number of classes, with each class assigned a specific number. In this manner, a user can easily identify which formations a team utilized during the course of the event, and may also be able to identify when a team switches formations during the course of the event.

Further, mapping the formation to a semantic label may allow organization computing system 104 to detect or flag when a team changes structurally through the game, across many games, or summarize a team's shape across a season.

As those skilled in the art recognize, such prediction engine 120 may enable dynamic user querying. For example, by analyzing a plurality of matches involving a plurality of teams across a plurality of seasons, prediction engine 120 may allow a user to dynamically transmit queries to organization computing system 104 to determine which teams execute certain formations. In another example, organization computing system 104 may receive a possession-chain (e.g., a trajectory of a ball path) as an input query. In response, organization computing system 104 may provide team formations that match or are associated with the trajectory. This may allow a user to compare various team reactions to certain ball trajectories.

Figure 8A:
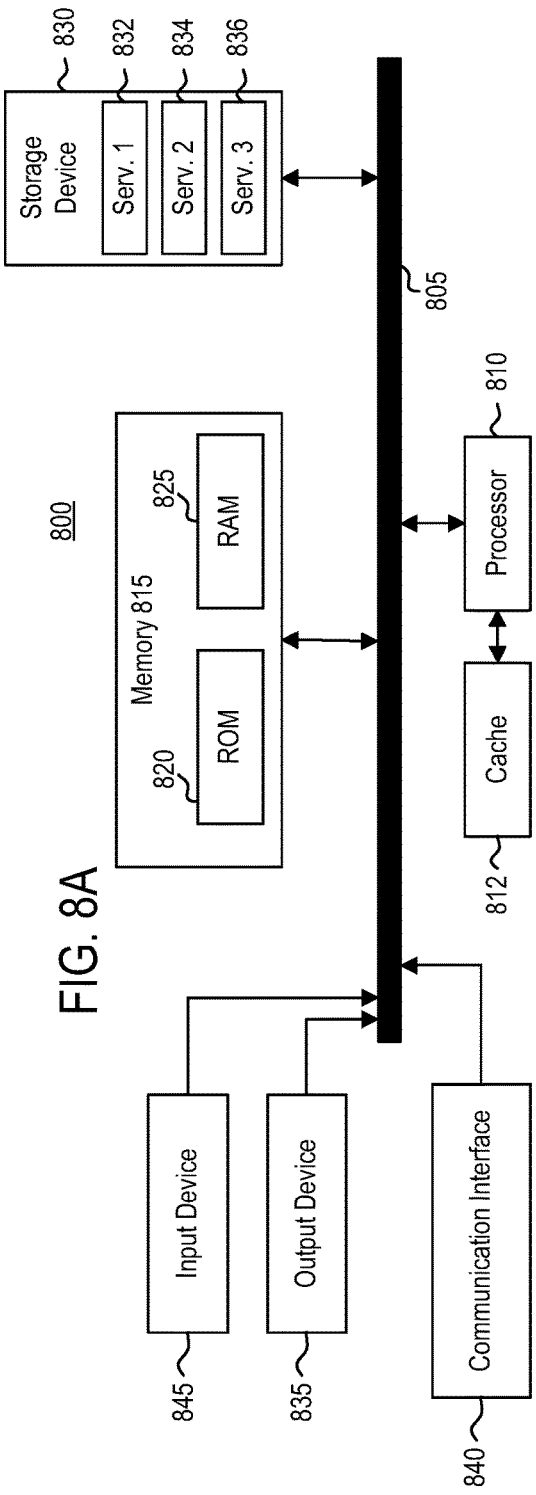
FIG. 8A is a block diagram illustrating a computing device, according to example embodiments.

FIG. 8A illustrates an exemplary system bus architecture of computing system 800, according to example embodiments. System 800 may be representative of at least a portion of organization computing system 104. One or more components of system 800 may be in electrical communication with each other using a bus 805. System 800 may include a processing unit (CPU or processor) 810 and a system bus 805 that couples various system components including the system memory 815, such as read only memory (ROM) 820 and random access memory (RAM) 825, to processor 810. System 800 may include a cache of high-speed memory connected directly with, in close proximity to, or integrated as part of processor 810. System 800 may copy data from memory 815 and/or storage device 830 to cache 812 for quick access by processor 810. In this way, cache 812 may provide a performance boost that avoids processor 810 delays while waiting for data. These and other modules may control or be configured to control processor 810 to perform various actions. Other system memory 815 may be available for use as well. Memory 815 may include multiple different types of memory with different performance characteristics. Processor 810 may include any general-purpose processor and a hardware module or software module, such as service 1 832, service 2 834, and service 3 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with the computing system 800, an input device 845 may represent any number of input mechanisms, such as a microphone for speech, a touch-sensitive screen for gesture or graphical input, keyboard, mouse, motion input, speech and so forth. An output device 835 (e.g., a display) may also be one or more of a number of output mechanisms known to those of skill in the art. In some instances, multimodal systems may enable a user to provide multiple types of input to communicate with computing system 800. Communications interface 840 may generally govern and manage the user input and system output. There is no restriction on operating on any particular hardware arrangement and therefore the basic features here may easily be substituted for improved hardware or firmware arrangements as they are developed.

Storage device 830 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 may include services 832, 834, and 836 for controlling the processor 810. Other hardware or software modules are contemplated. Storage device 830 may be connected to system bus 805. In one aspect, a hardware module that performs a particular function may include the software component stored in a computer-readable medium in connection with the necessary hardware components, such as processor 810, bus 805, output device 835, and so forth, to carry out the function.

Figure 8B:
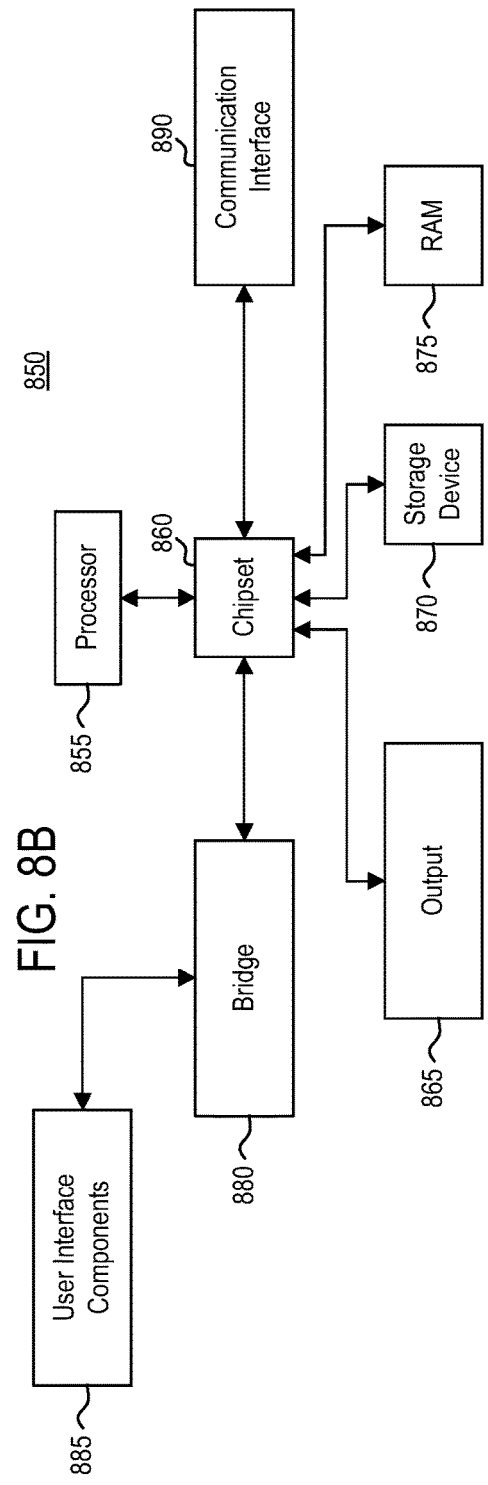
FIG. 8B is a block diagram illustrating a computing device, according to example embodiments.

FIG. 8B illustrates a computer system 850 having a chipset architecture that may represent at least a portion of organization computing system 104. Computer system 850 may be an example of computer hardware, software, and firmware that may be used to implement the disclosed technology. System 850 may include a processor 855, representative of any number of physically and/or logically distinct resources capable of executing software, firmware, and hardware configured to perform identified computations. Processor 855 may communicate with a chipset 860 that may control input to and output from processor 855. In this example, chipset 860 outputs information to output 865, such as a display, and may read and write information to storage device 870, which may include magnetic media, and solid state media, for example. Chipset 860 may also read data from and write data to RAM 875. A bridge 880 for interfacing with a variety of user interface components 885 may be provided for interfacing with chipset 860. Such user interface components 885 may include a keyboard, a microphone, touch detection and processing circuitry, a pointing device, such as a mouse, and so on. In general, inputs to system 850 may come from any of a variety of sources, machine generated and/or human generated.

Chipset 860 may also interface with one or more communication interfaces 890 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 855 analyzing data stored in storage device 870 or RAM 875. Further, the machine may receive inputs from a user through user interface components 885 and execute appropriate functions, such as browsing functions by interpreting these inputs using processor 855.

It may be appreciated that example systems 800 and 850 may have more than one processor 810 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
 identifying, by a computing system, player tracking data and event data corresponding to a match that includes a first team and a second team, wherein the player tracking data includes one or more coordinate positions of each player during the match, and wherein the event data defines one or more events that occur during the match;

dividing, by the computing system, the player tracking data into a plurality of segments based on the event data;

for each segment of the plurality of segments, learning, by the computing system, a first formation associated with a respective team in possession;

for each segment of the plurality of segments, learning, by the computing system, a second formation associated with a respective team not in possession;

mapping, by the computing system, the first formation to a first semantic label;

mapping, by the computing system, the second formation to a second semantic label;

detecting, by the computing system, a formation change based on the mapped first formation or the mapped second formation;

outputting, by the computing system, a flag corresponding to the detected formation change.

2. The method of claim 1, further comprising:

receiving, by the computing system from a user device, a request to view a formation of a target team across a target game; and based on the request, generating, by the computing system, a graphical output that visually indicates a change in the formation of the target team across the target game.

3. The method of claim 1, further comprising:

receiving, by the computing system from a user device, a request to view a formation of a target team across a season;

identifying, by the computing system, a plurality of target games associated with the season; and based on the request, generating, by the computing system, a graphical output that visually indicates one or more changes in the formation of the target team across the season.

4. The method of claim 1, further comprising:

receiving, by the computing system from a user device, a request to view a response of a target team to a trajectory of a ball path; and based on the request, generating, by the computing system, a graphical output that visually indicates a formation of the target team responsive to the trajectory of the ball path.

5. The method of claim 4, further comprising:

receiving, by the computing system from the user device, a second request to view a second response of a second target team to the trajectory of the ball path; and based on the request, generating, by the computing system, a second graphical output that visually indicates a second target formation of the second target team responsive to the trajectory of the ball path and compares the second target formation of the second target team to the formation of the target team.

6. The method of claim 1, wherein learning, by the computing system, the first formation associated with the respective team in possession comprises:

generating a vector representation of the player tracking data, wherein the vector representation comprises a total number of frames, a total number of players, and a dimensionality of the player tracking data.

7. The method of claim 1, further comprising:

initializing, by the computing system, one or more cluster centers of the player tracking data with one or more average player positions.

8. A non-transitory computer readable medium comprising one or more sequences of instructions, which, when executed by one or more processors, causes a computing system to perform operations comprising:

identifying, by a computing system, player tracking data and event data corresponding to a match that includes a first team and a second team, wherein the player tracking data includes one or more coordinate positions of each player during the match, and wherein the event data defines one or more events that occur during the match;

dividing, by the computing system, the player tracking data into a plurality of segments based on the event data;

for each segment of the plurality of segments, learning, by the computing system, a first formation associated with a respective team in possession;

for each segment of the plurality of segments, learning, by the computing system, a second formation associated with a respective team not in possession;

mapping, by the computing system, the first formation to a first semantic label;

mapping, by the computing system, the second formation to a second semantic label;

detecting, by the computing system, a formation change based on the mapped first formation or the mapped second formation;

outputting, by the computing system, a flag corresponding to the detected formation change.

9. The non-transitory computer readable medium of claim 8, further comprising:

receiving, by the computing system from a user device, a request to view a formation of a target team across a target game; and based on the request, generating, by the computing system, a graphical output that visually indicates a change in the formation of the target team across the target game.

10. The non-transitory computer readable medium of claim 8, further comprising:

receiving, by the computing system from a user device, a request to view a formation of a target team across a season;

identifying, by the computing system, a plurality of target games associated with the season; and based on the request, generating, by the computing system, a graphical output that visually indicates one or more changes in the formation of the target team across the season.

11. The non-transitory computer readable medium of claim 8, further comprising:

receiving, by the computing system from a user device, a request to view a response of a target team to a trajectory of a ball path; and based on the request, generating, by the computing system, a graphical output that visually indicates a formation of the target team responsive to the trajectory of the ball path.

12. The non-transitory computer readable medium of claim 11, further comprising:

receiving, by the computing system from the user device, a second request to view a response of a second target team to the trajectory of the ball path; and based on the request, generating, by the computing system, a second graphical output that visually indicates a second target formation of the second target team responsive to the trajectory of the ball path and compares the second target formation of the second target team to the formation of the target team.

13. The non-transitory computer readable medium of claim 8, wherein learning, by the computing system, the first formation associated with the respective team in possession comprises:
generating a vector representation of the player tracking data, wherein the vector representation comprises a total number of frames, a total number of players, and a dimensionality of the player tracking data.

14. The non-transitory computer readable medium of claim 8, further comprising:
initializing, by the computing system, one or more cluster centers of the player tracking data with one or more average player positions.

15. A system, comprising:
a processor; and
a memory having programming instructions stored thereon, which, when executed by the processor, causes the system to perform operations comprising:
identifying player tracking data and event data corresponding to a match that includes a first team and a second team, wherein the player tracking data includes one or more coordinate positions of each player during the match, and wherein the event data defines one or more events that occur during the match;
dividing the player tracking data into a plurality of segments based on the event data;
for each segment of the plurality of segments, learning a first formation associated with a respective team in possession;
for each segment of the plurality of segments, learning a second formation associated with a respective team not in possession;
mapping the first formation to a first semantic label;
mapping the second formation to a second semantic label;
detecting a formation change based on the mapped first formation or the mapped second formation;
outputting a flag corresponding to the detected formation change.

16. The system of claim 15, wherein the operations further comprise:
receiving, from a user device, a request to view a formation of a target team across a target game; and
based on the request, generating a graphical output that visually indicates a change in the formation of the target team across the target game.

17. The system of claim 15, wherein the operations further comprise:
receiving, from a user device, a request to view a formation of a target team across a season;
identifying a plurality of target games associated with the season; and
based on the request, generating a graphical output that visually indicates one or more changes in the formation of the target team across a target season.

18. The system of claim 15, wherein the operations further comprise:
receiving, from a user device, a request to view a response of a target team to a trajectory of a ball path; and
based on the request, generating a graphical output that visually indicates a formation of the target team formation responsive to the trajectory of the ball path.

19. The system of claim 18, wherein the operations further comprise:
receiving, from the user device, a second request to view a second response of a second target team to the trajectory of the ball path; and
based on the request, generating a second graphical output that visually indicates a second target formation of the second target team responsive to the trajectory of the ball path and compares the second target formation of the second target team to the formation of the target team.

20. The system of claim 15, wherein learning the first formation associated with the respective team in possession comprises:
generating a vector representation of the player tracking data, wherein the vector representation comprises a total number of frames, a total number of players, and a dimensionality of the player tracking data.

\* \* \* \* \*